United States Patent [19]

True

[11] 4,125,040
[45] Nov. 14, 1978

[54] POWER TONG APPARATUS

[75] Inventor: Martin E. True, Houston, Tex.

[73] Assignee: Weatherford/Lamb, Inc., Houston, Tex.

[21] Appl. No.: 838,035

[22] Filed: Sep. 29, 1977

[51] Int. Cl.² .............................................. B25B 13/50
[52] U.S. Cl. ........................................ 81/52.5; 73/139
[58] Field of Search ........................... 81/52.5; 73/139; 173/12

[56] References Cited

U.S. PATENT DOCUMENTS

| | | | |
|---|---|---|---|
| 3,368,396 | 2/1968 | Van Burkleo et al. | 73/139 |
| 3,596,718 | 8/1971 | Fish | 173/12 |
| 3,606,664 | 9/1971 | Weiner | 73/139 |
| 3,693,727 | 9/1972 | Bell | 73/139 |
| 3,745,820 | 7/1973 | Weiner | 73/139 |

Primary Examiner—James L. Jones, Jr.
Attorney, Agent, or Firm—Fulbright & Jaworski

[57] ABSTRACT

Apparatus for control of a power tong for imparting torque to a tubular member to make a threaded connection with another member, torque being sensed by means such as a strain gauge and torque transducer. Cams are provided to coact with the throttle or motor valve lever of the power tong and are disengageable to allow the throttle or valve lever to move to an idle or neutral position when torque being imparted to the tubular member reaches a predetermined amount.

8 Claims, 12 Drawing Figures

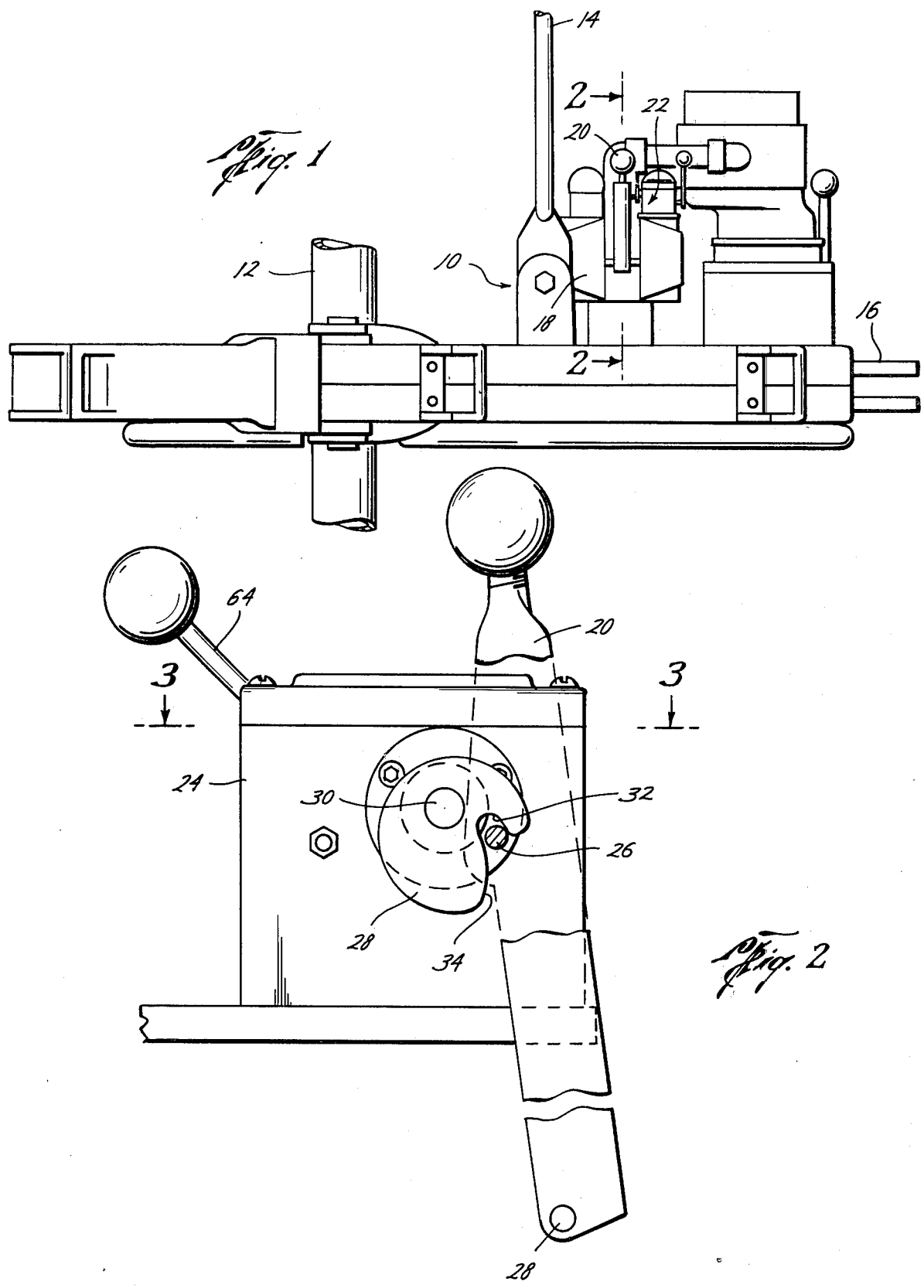

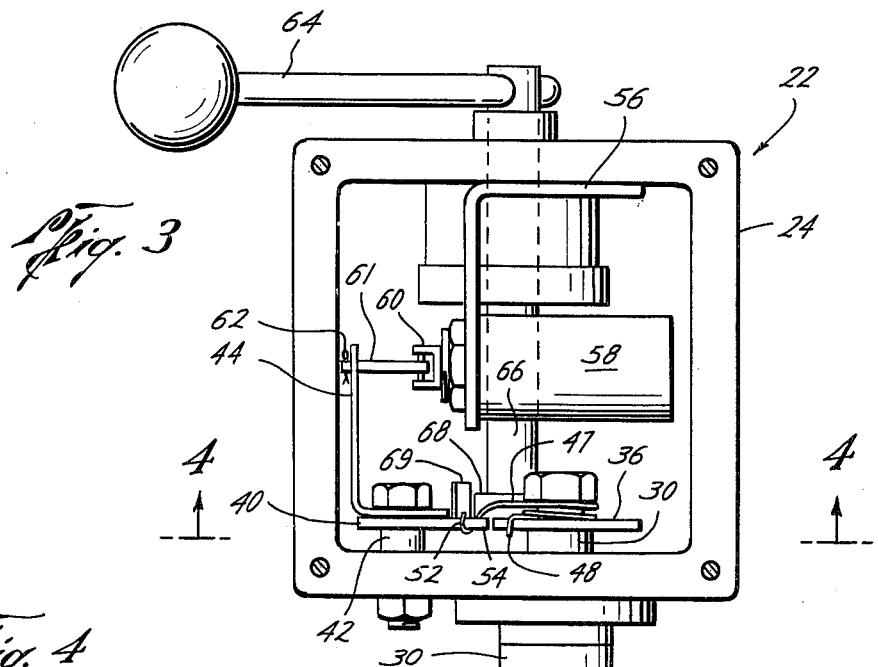
Fig. 3
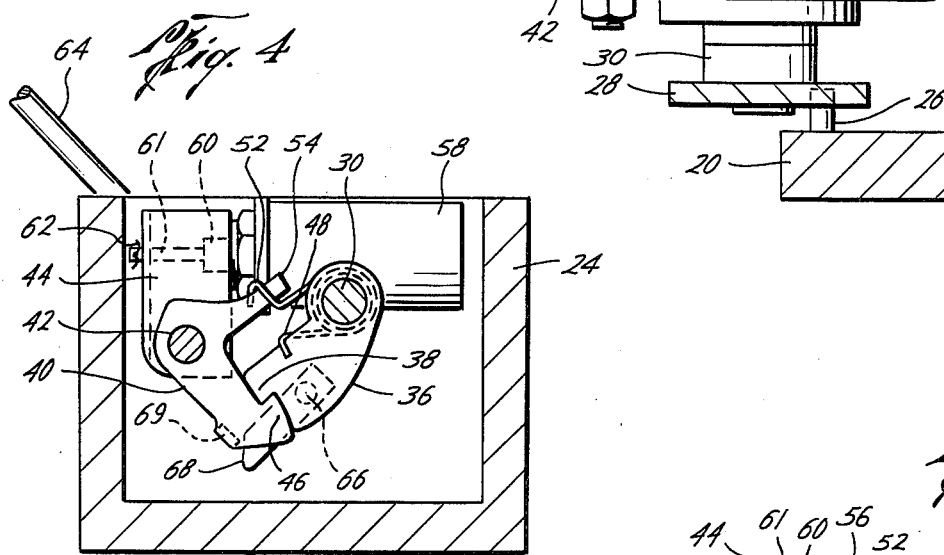
Fig. 4
Fig. 5
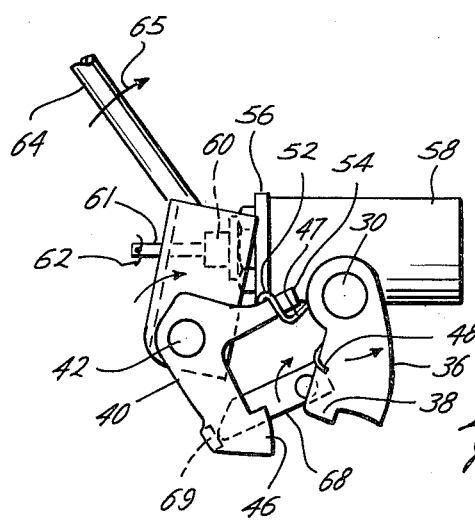
Fig. 6

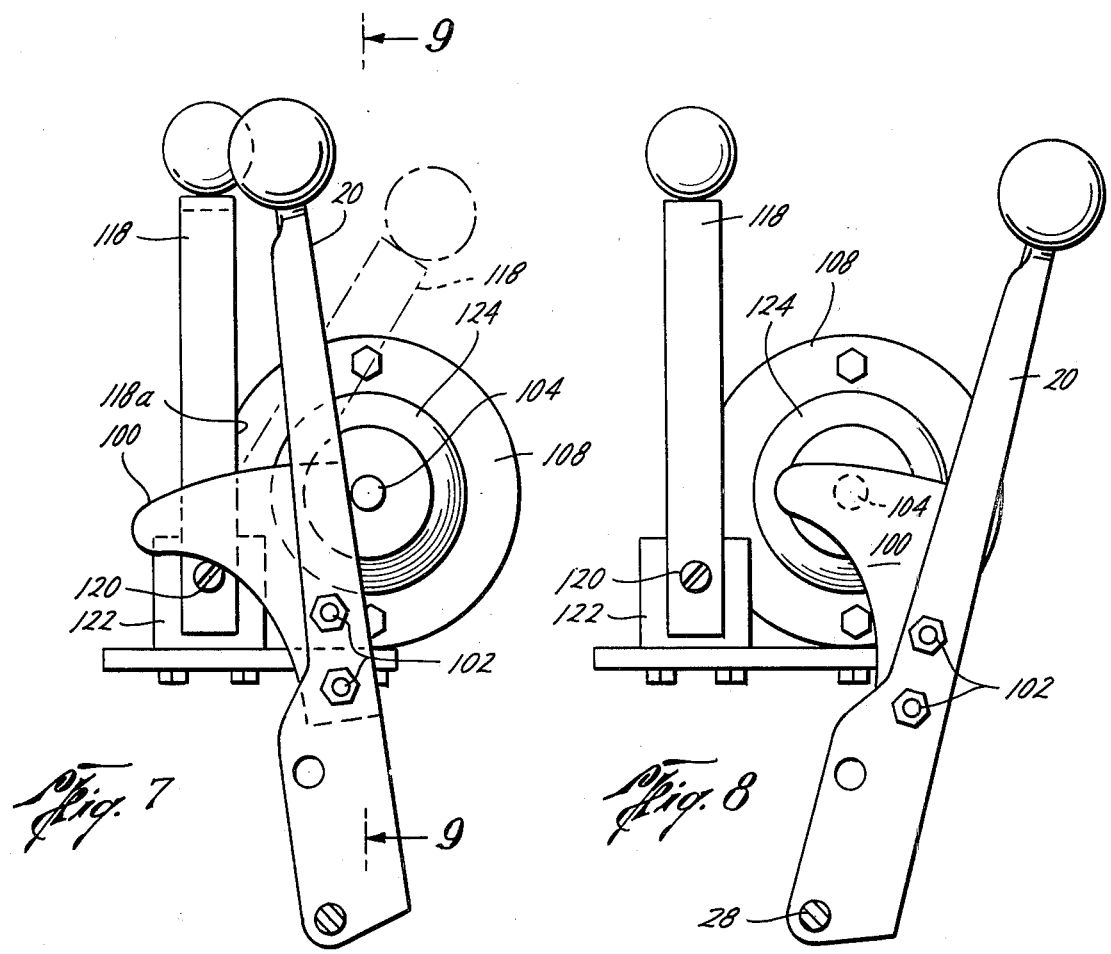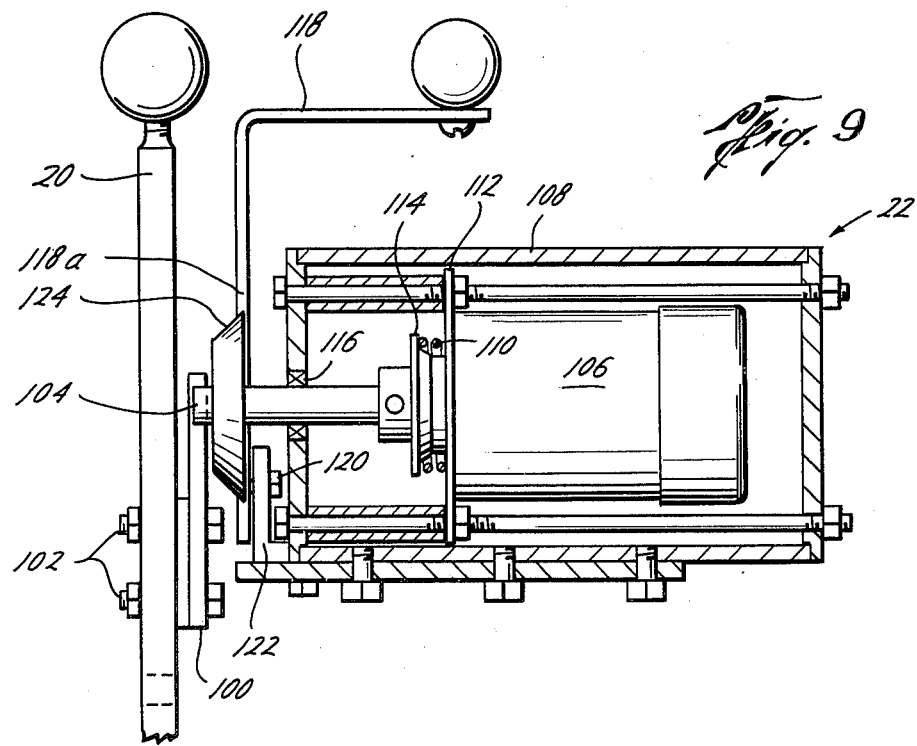

POWER TONG APPARATUS

Prior Art Statement

In the opinion of applicant, the closest prior art of which applicant is aware consists of U.S. Pat. Nos. 3,368,396, 3,606,664 and 3,745,820. In addition, manually operated power tongs for making and breaking connections for drill pipe, casing, tubing and the like have been standard drilling and well servicing equipment for years and comprise pertinent prior art. While there are many manufacturers and suppliers of power tongs, typical of such tongs are those illustrated in the 1974–75 *Composite Catalog of Oil Field Equipment & Services* published by World Oil, page 3387. In addition, applicant is aware of an application pending in the United States Patent Office as Ser. No. 791,113 filed April 26, 1977, now U.S. Pat. No. 4,091,451 by Peter D. Weiner et al. for "Method of and Apparatus for Making Up a Threaded Connection."

As disclosed in the three patents noted above, it is well known that in order to satisfactorily make up a threaded connection between two members having mating threads, such as oil field drill pipe, casing and tubing joints, bolts and nuts and the like, that a specified number of threads have to be engaged and a specific torque applied. The three patents illustrate apparatus for measuring torque and counting the number of turns a threaded connection is engaged. The patent application referenced above discloses a method of and apparatus for making up a threaded connection of two members having mating threads by monitoring the makeup as it proceeds and predicting failure of the joint before the end point of the makeup is reached thereby avoiding damage to the threaded connection. The threaded turns and the applied torque are continuously measured during the makeup and, if the torque/turn relationship does not proceed within certain specified parameters, the makeup is discontinued. Of course, the makeup torque is supplied by power tong devices such as those illustrated in the referenced Composite Catalog at page 3387. The power tongs employed in the systems described in the patents and in the patent application typically are hydraulically powered and include a valve in the hydraulic fluid supply line to the hydraulic motor, which valve is energized by a relay. The relay is actuated by an electrical signal indicative of the torque exerted by the rotary jaw members of the power tong, the torque being proportional to the strain indicated such as by an electrical strain gauge positioned in a backup line that anchors the power tong to a support. Thus, when a predetermined torque or other conditions are determined to exist, the valve in the hydraulic fluid supply line is energized to shut off fluid flow and thus stop the hydraulic motor.

As distinguished from the patents and application noted above, the apparatus of the present invention provides for direct mechanical shut-off or disengagement of a throttle lever otherwise manually operated for control of the power tong. The apparatus of the present invention presents a unique option to manual operation for more accurate control of the makeup of threaded connections.

Summary

The present invention is directed to the provision of apparatus for controlling the throttle of power tongs when making up joints between tubular members such as drill pipe, casing and the like. However, as distinguished from the prior art described above wherein a relay energizes a valve in the hydraulic fluid supply line, the apparatus of the present invention provides a mechanical means of locking and holding the power tong motor throttle in an open position until the desired makeup conditions have been met. For example, the customary practice of the operator of a power tong in a drilling operation is to hold the manual throttle lever which controls hydraulic fluid supply to the motor of the power tong in a full open position until the initial reference torque has been obtained in high gear. That is, the power tong throttle is actuated manually and placed in a high gear position until sensing means indicate that a pre-selected torque has been attained. Then the final makeup of the joint is achieved commonly by operating the power tong throttle lever manually in low gear. Of course, power tong units are powered also by pneumatic or electric motors, and the throttle control levers of nearly all such tongs are biased toward an idle or neutral position upon release of the lever by the operator.

The apparatus of the present invention provides mechanical means for maintaining the manual throttle lever of a power tong in an open position and automatically releases the lever when preselected specified conditions are achieved. The apparatus of the present invention includes cammed means integrally formed of or secured to the manual throttle lever, camming means coacting with and biased toward the cammed means, and means for disengaging the camming means from the cammed means upon reception of a signal generated by sensing means which sense a predetermined amount of torque imparted to the tubular member being made up into the joint. Three specific embodiments of apparatus according to the present invention are disclosed.

It is, therefore, an object of the present invention to provide an improvement in a power tong system, which system includes tong means for imparting torque to a tubular member to make a threaded connection with another member, power means for driving the tong means, a throttle lever to control the power means, and means for sensing the torque or torque and turns being imparted to the tubular member by the tong means and generating a signal upon sensing a predetermined torque or turns wherein the improvement comprises the provision of cammed means integrally formed of or secured to the throttle lever, camming means coacting with and biased toward the cammed means, and means for disengaging the camming means from the cammed means upon reception of the signal generated by the sensing means.

Another object of the present invention is the provision of such an improved power tong system wherein, more specifically, a lug is secured to or integrally formed of the throttle lever and projects laterally relative to movement of the lever, a cam is engageable with the lug of the throttle lever and is eccentrically mounted on a shaft with spring means to urge the cam into engagement with the lug, and disengaging means such as a solenoid linked to the cam shaft.

Still another object of the present invention is the provision of another embodiment of improved means for controlling a power tong system including a plate secured to or integrally formed laterally of the power tong throttle lever, a plunger with spring means for urging the plunger toward the plate of the throttle lever, and a solenoid for moving the plunger away from the throttle lever plate.

Yet an additional object of the present invention is the provision of a further embodiment of improved means for controlling a power tong system comprising a plate secured to or integrally formed laterally of the throttle lever of the power tong and having a recess therein, a detent with spring means for urging the detent toward the recess of the throttle lever plate, and a solenoid for moving the detent away from the throttle lever plate.

Yet another object of the present invention is the provision of means for maintaining the improved control means of the present invention out of engagement with the throttle lever in order that the throttle lever may be used manually in conventional manner.

Other and further objects, features and advantages will be apparent from the following description of the preferred embodiments of the invention, given for the purpose of disclosure and taken in conjunction with the accompanying drawings.

DESCRIPTION OF THE DRAWINGS

In the drawings forming a part of the disclosure herein, like character references designate like parts throughout the several views, wherein, FIG. 1 is a front elevation view of a typical hydraulically powered power tong with the improved control means according to the present invention, FIG. 2 is an isolated view partly in phantom, taken along the line 2—2 of FIG. 1 illustrating the improved control means of the most preferred embodiment of the present invention, FIG. 3 is an isolated plan view partly in cross section taken along the line 3—3 of FIG. 2, FIG. 4 is an isolated, partial cross section elevation view of linkage and solenoid means taken along the line 4—4 of FIG. 3, FIGS. 5 and 6 are isolated side elevation views of the linkage and solenoid apparatus of FIGS. 3 and 4, FIG. 7 is an isolated side elevation view of another embodiment of control apparatus according to the present invention, FIG. 8 is similar to FIG. 7 but showing the throttle in an idle or neutral position, FIG. 9 is a front-elevational view of the embodiment of apparatus illustrated in FIGS. 7 and 8 and is partly in cross section.

DESCRIPTION OF THE PREFERRED EMBODIMENTS

Figure 10:
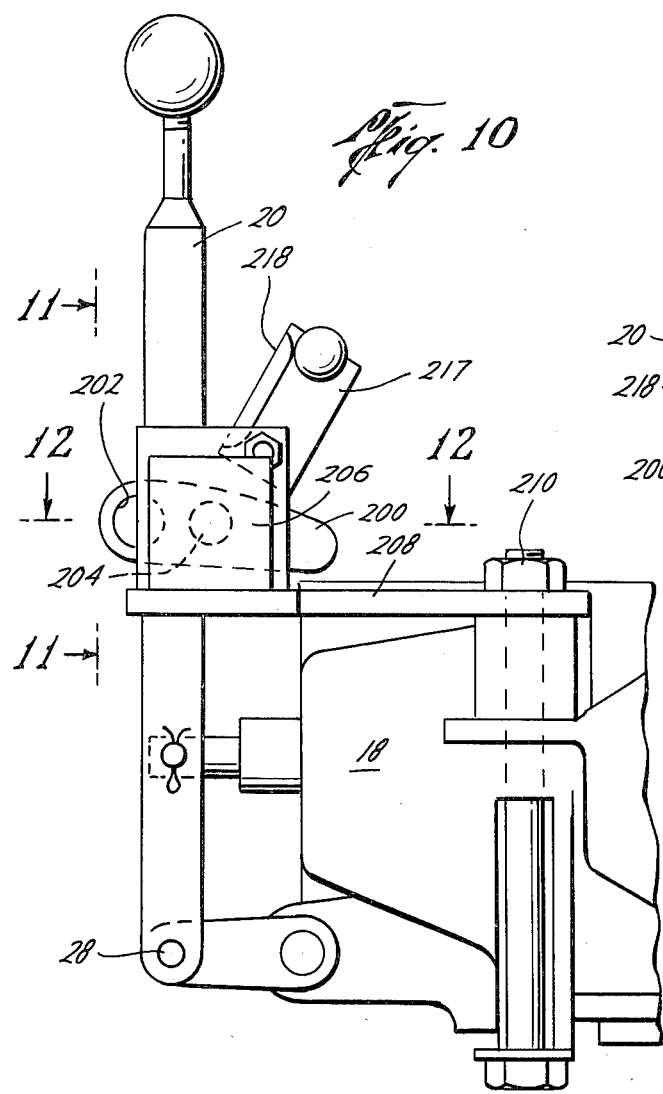
FIG. 10 is a side elevation view of still another embodiment of control apparatus according to the present invention.

With reference now to FIG. 1 of the drawings, a power tong 10 is illustrated operatively coacting in conventional manner with a tubular member such as a joint of drill pipe 12. The power tong 10 includes jaws (not shown) that engage and rotate the pipe 12 so that the pipe may threadedly engage another piece of pipe in the course of drilling an oil well. The power tong 10 is suspended from a derrick or the like by means of a support arm 14 as disclosed in the prior art references above, and a backup line (not shown) may be secured to tong end 16 of the power tong and connected to the derrick. Forming a link in the backup line may be a suitable strain gauge or the like and a transducer for supplying to a computer a signal proportional to strain in the backup line.

Typically, the power tong 10 is powered by means of hydraulic fluid controlled by a valve 18. An operator standing beside the power tong 10 actuates the valve by means of a lever 20 which, when pressed forward as viewed in FIG. 1, causes the power tong jaws to rotate in a forward direction. When the valve 20 is pulled toward the viewer in FIG. 1, the valve 18 reverses the flow of hydraulic fluid and the direction of the jaws and hence rotation of the pipe 12 is reversed. Between the forward and reverse positions is a neutral or idle position for the lever 20, and the lever 20 typically is biased into this neutral position.

In conventional operation, to make up the pipe 12 into a threaded connection with another joint of pipe, the lever 20 is pressed forward manually to rotate the pipe 12, and the lever is held in such position until torque sensed by the strain gauge in the backup line is determined by the computer to correspond to a preselected torque. At such point, the computer may generate a signal to actuate a bell, light or the like to signal the operator to release the lever 20 because the desired torque for makeup of the threaded connection has been reached. At such point the throttle lever 20 is released. If necessary, the power tong may be placed in a lower gear to achieve final makeup of the joint.

The apparatus comprising the present invention provides means for maintaining the throttle lever 20 in an open position and automatically releases the lever when pre-selected specified conditions are achieved. Apparatus of the present invention is indicated generally in FIG. 1 by the reference character 22. Three different embodiments of the apparatus 22 are disclosed herein as will now be described.

The most preferred embodiment of power tong control apparatus according to the present invention is illustrated in FIGS. 2-6 to which reference is made. As shown in FIGS. 2-4, a housing 24 supports as well as encloses a solenoid and linkages. The throttle lever 20 is provided with cammed means integrally formed thereof or secured thereto which, in this embodiment, is a lug 26 projecting laterally of the lever 20 toward the housing 24. The lever 20 is pivotally secured or journalled to the hydraulic valve 18 by means of a pin 28 so that the lever 20 may move to the left and to the right as viewed in FIG. 2.

The lug 26 formed of or secured to the lever 20 is engageable with camming means comprising a latching cam 28 eccentrically mounted on the shaft 30 which in turn is journalled through a wall of the housing 24, all of which may be readily seen in FIG. 3. The cam 28 is provided with a latching recess 32 such that when the shaft 30 is rotated counterclockwise (which in turn rotates the cam 28 counterclockwise) from the position shown in FIG. 2, the lug 26 is released from the recess 32 of the cam 28 so that the lever 20 may move to the right as viewed in FIG. 2 into its biased neutral or idle position. To return the lever 20 from a neutral position to the position as shown in FIG. 2, the lever 20 is moved to the left and the lug 26 engages the curved surface 34 of the cam 28 to in turn move the cam 28 in a clockwise direction so as to bring the recess 32 over and around the lug 26 and hence back into the position as shown in FIG. 2.

With reference now to FIGS. 3 and 4, and assuming that the lever 20, the lug 26 and the cam 28 are in relative positions as shown in FIG. 2, such relationship is maintained by virtue of linkages within the housing 24. A first link 36 is secured to and rotates with the shaft 30 and is provided with a tooth 38 at its extremity. A second link 40 is journalled to a support shaft 42 which is secured to the housing 24, the second link 40 being secured also to a third link 44. The second link 40 has a tooth 46 engageable with the tooth 38 of the first link 36 as best seen in FIG. 4. A helical spring 47 is disposed about the shaft 30, one end 48 of which engages about the first link 36 and the second end 52 of which engages about an extension 54 of the second link 40. The spring 47 thus urges the first link 36 in a counterclockwise direction of rotation and the second link 40 in a clockwise direction of rotation as viewed in FIG. 4.

Secured to the housing 24, such as by means of a bracket 56, is a solenoid 58 having a plunger 60. The plunger 60 engages by a link 61 through an aperture (not shown) within the upper part of the third link 44, and a cotter pin 62 in link 61 prevents disengagement thereof. Actuation of the solenoid 58 causes the plunger 60 and link 61 to move to the right as viewed in FIGS. 3-6, pulling and pivoting the link 44 to in turn pivot the link 40.

As regards operation of the embodiment of FIGS. 2-6, in the course of making a threaded connection of the pipe 12 with another joint of pipe, once a preselected torque or other specified conditions are sensed by sensing means such as a strain gauge in the backup line described previously, a signal is generated and transmitted to the solenoid 58 to actuate the solenoid. Thus the plunger 60 is pulled toward the solenoid and the links 40 and 44 are pivoted clockwise as viewed in FIGS. 3-6. The tooth 46 of the link 40 is disengaged from the tooth 38 of the link 36 as shown in FIG. 6, and the link 36 pivots in a counterclockwise direction as illustrated in FIG. 5. Thus the shaft 30 is rotated to in turn rotate the cam 28 in a counterclockwise direction as viewed in FIG. 2 so as to release the lug 26 from the recess 32 of the cam 28. Consequently, the throttle lever 20 may move to its neutral position to shut off the flow of hydraulic fluid to the hydraulic motor of the power tong 10 and stop rotative movement of the jaws of the power tong relative to the pipe 12.

Means are provided for maintaining the camming means out of engagement with the cammed means for full manual operation of the throttle lever 20. As viewed in FIGS. 2 and 3, a lever 64 is secured to one end of the shaft 66, the shaft 66 being journalled within the housing 24. At the opposed end of the shaft 66, is a cam 68 that abuts and is engageable with a lug 69 projecting from the lower end of the link 40. When the cam 28 is rotated counterclockwise (as viewed in FIG. 2) to release the lug 26 of the throttle lever 20, the link 40 is in the position illustrated in FIG. 6 and the cam 68 may be moved into the position as shown in FIG. 6 so as to lock against the lug 69 on the lower end of the link 40 by pulling the lever 64 to the right as indicated by the direction of arrow 65 in FIG. 6. By retaining the lever 64 in such position, engagement of the lug 26 of the throttle lever 20 with the cam 28 is prevented. Any movement of the cam 28 in turn moves the link 36, but the tooth 38 of the link 36 cannot engage the tooth 46 of the link 40, and hence the mechanism cannot be "recocked". Of course, moving the lever 64 to the left as viewed in FIG. 6 releases the cam 68 from the lug 69 on the link 40, and action of the spring 47 places the mechanism in a "recockable" condition. Thus the system of the present invention is once again restored to full ability to automatically control the throttle lever 20 in the manner as has been explained.

A second embodiment of apparatus is illustrated in FIGS. 7-9 which functions to produce a result analogous to the apparatus system of FIGS. 2-6. With reference to FIGS. 7-9, the cammed means comprises a plate 100 secured to the throttle 20 such as by means of bolts 102, or the plate may be formed integrally of the throttle lever 20. Otherwise, the throttle lever 20 shown in FIGS. 7-9 is identical in structure and operation to the throttle lever previously described with reference to FIGS. 1-6.

The camming means comprises a plunger 104 forming part of a solenoid 106 mounted within a housing 108 which in turn may be mounted to a suitable support on the power tong 10. The solenoid 106 includes a coil spring 110 acting between a plate 112 (forming a part of the housing 108) and another plate 114 secured to the plunger 104. Thus the spring 110 biases the plunger 104 outwardly, that is, to the left as viewed in FIG. 9. The plunger 104 is maintained in alignment by means of an appropriate journal 116 secured within the housing 108.

In operation, the power tong 10 is actuated to make the pipe 12 up into a joint by pressing the throttle lever 20 to the left as viewed in FIGS. 7 and 8. When the throttle lever 20 moves into position as shown in FIG. 7, the plunger 104 is forced by the spring 110 into a position behind the plate 100 of the throttle lever as best seen in FIG. 9. Thus the throttle lever 20 is held in its forward position until a signal from the computer as previously described is received. Upon reception of an appropriate signal, the solenoid 106 is energized to pull the plunger 104 to the right as viewed in FIG. 9 to thus release the throttle lever 20 for return to its neutral position as shown in FIG. 8. Preferably, the plate 100 is elongate as illustrated in the drawings so that the plunger 104 may ride on its surface in order that the plunger does not interfere with operation of the throttle either in neutral or reverse positions.

In the event that the power tong 10 is to be controlled manually without assistance of the mechanism of FIGS. 7-9, means are provided to maintain the camming means, i.e., the plunger 104, out of engagement with the cammed means, i.e., the plate 100. Such means comprise a lever 118 journalled such as by means of a bolt 120 to a bracket 122 forming a part of the housing 108. The edge 118a of the lever 118 may be knifed if desired so as to engage a frusto-conical cam 124 secured to the plunger 104. By moving the lever 118 into the position shown in dotted outline in FIG. 7, the frusto-conical member 124 is retained out of engagement with and out of the path of the plate 100. Thus the throttle lever 20 may be moved without interference from the control means of this embodiment.

Figure 11:
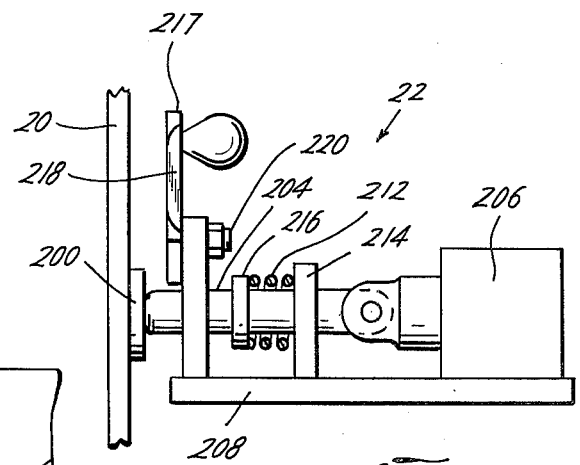
FIG. 11 is a front elevation view taken along the line 11—11 of FIG. 10.
Figure 12:
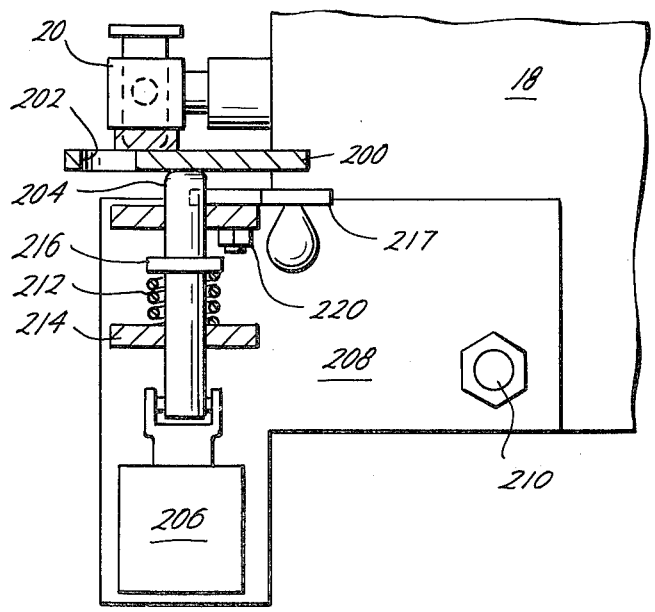
FIG. 12 is a plan view, partly in cross section, taken along the line 12—12 of FIG. 10.

Referring now to still another embodiment of control apparatus according to the present invention as illustrated in FIGS. 10-12, the throttle lever 20 is provided with cammed means comprising a plate 200 secured to or integrally formed laterally of the throttle lever 20. The plate 200 is provided with a recess or aperture 202 at its forward end as shown in FIG. 10.

Camming means are provided comprising a detent 204 which, in effect, is the plunger of a solenoid 206. The solenoid 206 is secured to a base plate 208 which in turn is secured such as by a bolt 210 to the hydraulic valve 18. A spring 212 acting between a plate 214 secured to the support 208 and a plate 216 secured to the detent 204 urges the detent 204 into engagement with the plate 200.

As regards operation of the embodiment of FIGS. 10-12, the operation is similar to that of the embodiment of FIGS. 7-9 except that the detent 204 engages the recess 204 of the plate 200 to maintain the throttle lever 20 in a forward position to actuate the valve 18, that is, to drive jaws of the power tong 10 and make up the pipe 12 into a joint. Energizing the solenoid 206 releases the detent 204 from the recess 202 of the plate 200 to allow the throttle 20 to return to its neutral position. A lever 217 having a knife face 218 and pivotally secured such as by means of a bolt 220 to the plate 208 may be moved to the left as viewed in FIG. 10 to engage and retain the end of the detent 204 out of engagement with the plate 200. In such configuration, the lever 20 may be operated manually without control being exerted by the mechanism of the embodiment of FIGS. 10-12.

As will be recognized by those skilled in the art, the solenoids 58, 106 and 206 in the respective embodiments may be replaced by any suitable equivalent means such as air diaphragms, air actuated piston/cylinder or hydraulic actuated piston/cylinder means and the like. Electrically actuated solenoids as disclosed herein are preferred because of the ready availability of an electrical supply with most systems in which apparatus of the present invention is used. In any event, as used in the specification and claims herein, it will be understood that the term "solenoid" encompasses these equivalents.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:

1. In a power tong system which includes,
   a. tong means for imparting rotation and torque to a tubular member to make a threaded connection with another member,
   b. power means for driving the tong means,
   c. a throttle lever to control the power means, and
   d. means for sensing the torque or torque and turns being imparted to the tubular member by the tong means (a) and generating a signal upon sensing a predetermined torque or torque and turns,
the improvement comprising the provision of,
   e. cammed means integrally formed of or secured to the throttle lever (c),
   f. camming means coacting with and biased toward the cammed means (e), and
   g. means for disengaging the camming means (f) from the cammed means (e) upon reception of the signal generated by the sensing means (d).

2. The improved power tong system of claim 1, wherein
   i. the cammed means (e) comprises a lug secured to or integrally formed of the throttle lever (c), said lug projecting laterally relative to movement of the lever,
   ii. the camming means (f) comprises a cam engageable with the lug of the throttle lever and eccentrically mounted on a shaft with spring means coacting therewith for urging said cam toward engagement with said lug, and
   iii. the disengaging means (g) comprises a solenoid actuatable by the signal generated by the sensing means (d), and linkage means coacting with the shaft of the eccentrically mounted cam for translating motion of said solenoid to said shaft.

3. The improved power tong system of claim 1, wherein,
   i. the cammed means (e) comprises a plate secured to or integrally formed laterally of the throttle lever (c),
   ii. the camming means (f) comprises a plunger with spring means for urging said plunger toward said throttle lever plate, and
   iii. the disengaging means (g) comprises a solenoid actuatable by the signal generated by the sensing means (d) for moving the plunger away from the throttle lever plate.

4. The improved power tong system of claim 1, wherein
   i. the cammed means (e) comprises a plate secured to or integrally formed laterally of the throttle lever (c) and having a recess therein,
   ii. the camming means (f) comprises a detent with spring means for urging said detent toward the recess of the throttle lever plate, and
   iii. the disengaging means (g) comprises a solenoid actuatable by the signal generated by the sensing means (d) for moving the detent away from the throttle lever plate.

5. The power tong system of claim 1 including, additionally, means for maintaining the camming means (f) out of engagement with the cammed means (e) for full manual operation of the power tong system.

6. In a power tong system which includes,
   a. tong means for imparting rotation and torque to a tubular member to make a threaded connection with another member,
   b. power means for driving the tong means,
   c. a throttle lever biased toward an idle position to control the power means, and
   d. means for sensing the torque or torque and turns being imparted to the tubular member by the tong means (a), and generating a signal upon sensing a predetermined torque or torque and turns,
the improvement comprising the provision of,
   e. a cam follower member integrally formed of or secured to a throttle lever (c),
   f. cam means eccentrically mounted on a shaft for reciprocating engageable movement with the cam follower (e),
   g. a solenoid actuatable by the signal generated by the sensing means (d), and
   h. linkage means coacting with the shaft of the cam means (f) for translating motion of the solenoid (g) to said shaft.

7. The improved power tong system of claim 6 including, additionally, means for selectively preventing the cam means (f) from operatively functioning with the cam follower member (e).

8. The improved power tong system of claim 6 wherein the cam means (f) comprises a latching cam eccentrically mounted on said shaft.

* * * * *